June 1, 1937.  H. GRUMEL  2,082,492
MODULATION MEASUREMENT
Filed Feb. 27, 1934
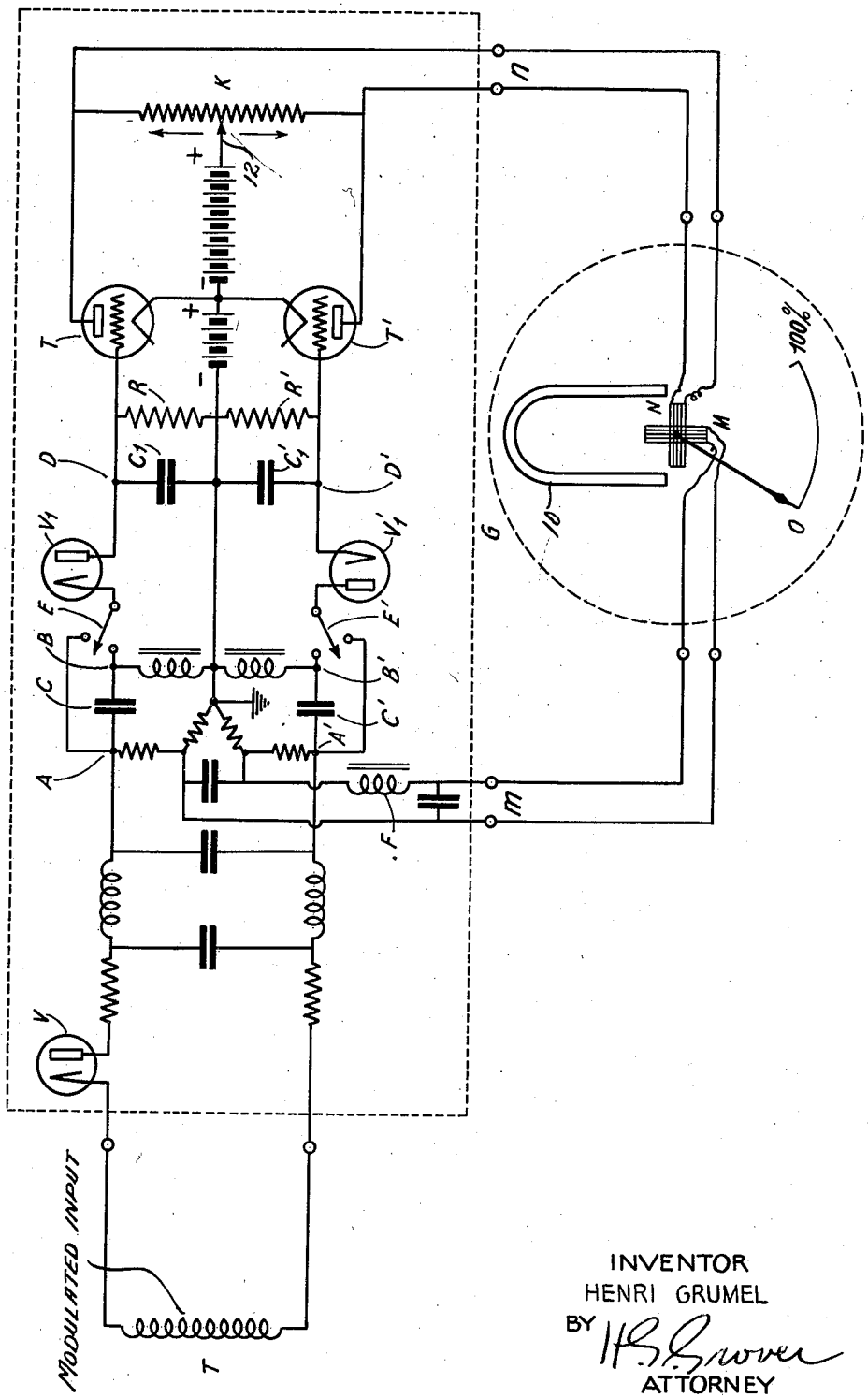
INVENTOR
HENRI GRUMEL
BY
ATTORNEY Patented June 1, 1937

2,082,492

UNITED STATES PATENT OFFICE 2,082,492

MODULATION MEASUREMENT

Henri Grumel, Paris, France, assignor to Compagnie Generale de Telegraphie Sans Fil, a corporation of France Application February 27, 1934, Serial No. 713,076
In France March 2, 1933

4 Claims. (Cl. 179—171)

This invention relates to the method of and means for direct measurement of the degree or percentage of modulation.

The present invention is principally concerned with systems of telephonic or telegraphic transmission by means of a modulated carrier current.

It is known that in systems of this sort a carrier current (either direct current or radio frequency) is modulated by the telephone or voice current to be transmitted. The latter consisting either of voice or singing consists of complex currents of low frequency and their harmonics, for example, currents varying in frequency between 30 and 10,000 cycles per second.

It is also known that in studying systems of the kind here concerned there enters usually a numerical coefficient which is known as the degree or percentage of modulation and which is defined by this relation:

$$\frac{I_{max} - Ip}{Ip}$$

wherein $I_{max}$ stands for the maximum amplitude or the amplitude of the crest of the modulated current and $Ip$ the amplitude of the carrier current.

It follows from this equation that the ratio of modulation may vary between zero and 1. Its determination is important, for this makes it possible to obtain a clue regarding the conditions of operation of the system.

The object of the present invention is a method adapted to ascertain instantaneously the value of the degree or percentage of modulation of a modulated carrier current by the aid of the direct reading of an indicator device or instrument.

This method applies more particularly to the direct measurement of the degree of modulation of a radio-telephonic transmitter station, and the same may be employed just as readily at close proximity to the transmitter as at a certain distance therefrom by utilizing, for instance, the current picked up and amplified in a receiving station or outfit. It applies also to a direct measurement of the degree of modulation of any system of telephony or telegraphy by wire or without wire, and more generally to every system of transmission by means of a modulated carrier current.

The principle underlying this method consists in causing to act simultaneously upon one and the same indicator device two currents being respectively proportional to the value of the numerator $I_{max} - Ip$ and to the value of the denominator $Ip$ so that the position of the indicator element such as a moving needle, a conveniently located spot or any other suitable visual indicating device depends only upon the relation of these two factors and that it is independent of the absolute value of each thereof provided only that the incoming current is higher than a certain level which is a function only of the inertia, or friction of the device.

Such a device could be graduated directly to read in terms of the degree of modulation or modulation percentage ranging all the way from zero to 100, for instance. Hence, it will thus be capable of direct reading.

In the embodiment hereinafter to be disclosed with a view to defining more precisely the underlying principle of the invention and making more easily understood and, more particularly, indicating in a practical way one mode of constructing the indicator device, the latter, for example, is constituted in the form of a galvanometer with a mobile system comprising two perpendicular coils being in a state of indifferent equilibrium. Such a device is known as a "quotientmeter". It will be understood that, without departing from the scope of the invention, any other equivalent device could be employed.

It will also be understood that the electric key diagram which is shown by way of example could be replaced by any other equivalent scheme.

Referring to the accompanying drawing, T represents a winding intended to pick up part of the modulated carrier current. If the modulation percentage indicator device is to be installed in a radio-telephonic transmitter station, the winding T may consist, for instance, of a toroid, or toroid coil, or a coil coupled with the antenna. If the device is to be mounted in a receiving station or equipment, the winding T, for instance, could consist of the secondary of a transformer fed from the antenna, with the optional interposition of the necessary amplifiers. The current picked up by the winding T, under these conditions, is a modulated radio frequency current. This current is first rectified by means of a valve V of high load resistance in order to insure linear detection. After filtering the radio frequency component of the detected current, there is obtained between the points A and B and A'B' a modulated continuous voltage, the mean and maximum amplitudes of which are proportional to those of the radio frequency current picked up by the winding T. It is this modulated continuous potential that would be collected directly without the interpositon of the valve and the filter if in lieu of a modulated radio frequency there were received at the input end of the apparatus a modulated direct current. The remainder of the scheme would be the same in both instances.

The potential obtained at AA' is then fed, by way of two different branches or shunts, to the two coils M and N of the galvanometer G. The coils M and N are relatively fixed and are mounted for joint rotation in the field produced by a magnet 10.

On the one hand, the filter F included in the output circuit m stops the low frequency of modulation with the results that there is obtained across the terminals m a continuous potential proportional to the amplitude of the carrier current Ip.

On the other hand, the blocking condensers C and C' stop in the other branch the direct current component of the current so that what remains across the terminals B and B' is the low-frequency voltage. The condensers C1 and C1' may become charged up to the crest value of this potential by the aid of the valves V1 and V1'. There is thus obtained between D and D' a continuous voltage proportional to the crest value of the low frequency, that is to say, to the value $I_{max}-Ip$. This potential is applied to the grid circuit of two amplifier tubes T and T' connected push-pull-fashion which makes available the voltage required for feeding the coil N of the galvanometer G. There is thus available across terminals n a direct current voltage u proportional to $I_{max}-Ip$. The push-pull arrangement allows of eliminating the permanent plate current, and the dissymmetry due to slight differences between the characteristics of the tubes is readily corrected by regulating the position of the slider 12 of the potentiometer K.

The two potentials u and U impressed upon the terminals of the two coils N and M of the galvanometer G are thus respectively proportional to the values $I_{max}-Ip$ and to Ip.

The galvanometer G is an instrument of the quotientmeter type, the movable system of which is constituted by two coils relatively fixed at right angles to each other and mounted in a state of indifferent equilibrium in the field produced by 10.

In applying voltage U to coil M, if voltage u is zero in value or absence of modulation, the coil M becomes placed at right angles to the magnetic field as shorn. This will be the zero position.

In the presence of different values of u the instrument will assume a position depending only upon the ratio u:U, and the instrument will be calibrated in such a way that for a modulation of 100%, the needle will reach the end of the scale or dial marked 100.

The calibration of the device evidently is a function of the characteristics of the tubes, and these latter are liable to vary slightly from one tube to the next; however, one merit of the present scheme is that the calibration is readjustable immediately without requiring any comparison or calibration with some other device. The calibration as a matter of fact, requires two operations, to wit, adjustment to zero and adjustment to the maximum deflection of 100%. These two operations are accomplishable as follows:

Regulation to the zero point is effected by setting the slider of the potentiometer K in a way as hereinbefore indicated.

Adjustment to maximum deviation corresponding to 100 percent modulation is effected by momentarily uniting by a "pair of keys" the points E and E' with points A and A'. Under these conditions, the condensers C1 and C1' in the absence of modulation will be charged to a voltage equal to that which they should attain for 100 per cent modulation. It will be sufficient at this instant to adjust, for instance, a shunt, not shown, which could be disposed on one of the coils so as to cause the device to undergo its maximum deflection.

Different combinations of detail could, of course, be conceived. For instance, a device could be provided with a view to discharging the condensers C1 and C1' between two values or positions. For this purpose, there could be provided at the terminals of these condensers resistances of high value R and R'. In this case, there is obtained a very effective control and check-up on the level or percentage of modulation, though the measurement of the crest currents, on the other hand, is liable to be vitiated by an error. It would also be feasible to discharge the said condensers intermittently or periodically by the aid of contacts actuated by a clockwork movement which is not shown on the drawing. In this manner, the value of the most prominent peak will be obtained inside a time interval comprised between two successive contacts.

The first combination hereinbefore mentioned involving the addition of the resistances R and R' provides a simple arrangement. This arrangement would cause the circuit of the condensers to work upon the coil N which, in that instance, would have to consist of a winding involving high resistance.

In this latter case one could also dispense with the condensers C1 and C1', while using the device not for the measurement of the rates or percentages of the modulation as hereinbefore described, but rather for evaluating the mean modulations, the deviations of the instrument then depending only upon the modulation while being independent of the power or energy collected.

It will finally be noted that the arrangement hereinbefore disclosed according to this invention is also adapted to effect a measurement of the percentages of modulation by utilizing the positive alternation or the negative alternation of the modulation current. For this purpose all that is necessary is to reverse the connections brought to the points marked B and B'. This has the particular merit of assuring oneself of the symmetry of the modulation.

I claim:

1. In a system for measuring the degree of modulation of modulated carrier wave energy, means for collecting the modulated carrier wave energy, a rectifier connected to and fed by the collecting means, a filter connected to the output of the rectifier for separating the carrier wave energy components from the direct current components and the superimposed modulation frequency component, a second filter connected to the output of said first filter for obtaining a direct current component proportional to the carrier wave energy intensity, a diverting circuit comprising condensers in series with additional rectifiers connected to said first filter, condensers in shunt to the outputs of the additional rectifiers, a pointer driven by two relatively fixed windings mounted for joint rotation in a magnetic field, a connection between one of said windings and said second filter, a connection between the outputs of said additional rectifiers and the other of said windings and means for rendering the movement of said windings dependent on the ratio between the two currents supplied thereto and independent of the amplitudes of said currents.

2. A system as recited in claim 1 in which means is provided for short-circuiting the series condensers in said diverting circuit.

3. A system as recited in claim 1 in which a push-pull amplifier has its input electrodes connected with the outputs of the rectifiers in said diverting circuit and its output electrodes connected to one of said windings.

4. A system as recited in claim 1 in which resistances are connected in shunt with the condensers shunting the outputs of the rectifiers in said diverting circuit.

HENRI GRUMEL.